United States Patent
Alanis et al.

(10) Patent No.: US 10,607,506 B2
(45) Date of Patent: Mar. 31, 2020

(54) BRAILLE READING USING FINGERPRINT SCANNER AND VARYING VIBRATION FREQUENCIES

(71) Applicant: INTERNATIONAL BUSINESS MACHINES CORPORATION, Armonk, NY (US)

(72) Inventors: Francisco J. Alanis, Cedar Park, TX (US); Edgar O. Cantu, Round Rock, TX (US); Maria deLourdes Garza, Round Rock, TX (US); Carlos F. Gomez, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 375 days.

(21) Appl. No.: 15/285,930

(22) Filed: Oct. 5, 2016

(65) Prior Publication Data

US 2018/0096631 A1   Apr. 5, 2018

(51) Int. Cl.
*G09B 21/00*   (2006.01)

(52) U.S. Cl.
CPC .................. *G09B 21/004* (2013.01)

(58) Field of Classification Search
CPC .. G09B 21/003; G09B 21/004; G09B 21/005; G09B 21/007; G09B 21/008; G09B 21/009; G09B 21/025; G08B 6/00
USPC ........................................................ 434/114
See application file for complete search history.

(56) References Cited

U.S. PATENT DOCUMENTS

| | | | | |
|---|---|---|---|---|
| 6,675,028 B1 * | 1/2004 | Heie | .................. | H04M 1/72594 434/113 |
| 6,850,150 B1 * | 2/2005 | Ronkainen | ........ | H04M 1/72569 340/407.1 |
| 8,204,995 B2 * | 6/2012 | Sathish | .................. | H04L 67/14 709/220 |

(Continued)

FOREIGN PATENT DOCUMENTS

WO     2006050513      5/2006

OTHER PUBLICATIONS

Samsung smartwatch patent uses in-display fingerprint sensor, Dec. 3, 2018, Slash Gear, [retrieved on May 28, 2019]. Retrieved from the Internet <URL: https://www.slashgear.com/samsung-smartwatch-patent-uses-in-display-fingerprint-sensor-03556704/>, (Year: 2018).*

(Continued)

*Primary Examiner* — Thomas J Hong
(74) *Attorney, Agent, or Firm* — Alexander Jochym; Andrew D. Wright; Roberts Mlotkowski Safran Cole & Calderon, P.C.

(57) ABSTRACT

Systems and methods for braille reading using a fingerprint scanner and varying vibration frequencies are disclosed. A method includes: obtaining, by a computer device, data defining a braille cell; identifying, by the computer device, one of six predefined areas of a fingerprint based on the one of the six predefined areas being centered on a fingerprint sensor; determining, by the computer device, a state of a braille dot of the braille cell that corresponds to the one of the six predefined areas of the fingerprint; and generating, by the computer device, one of a first type of vibration and a second type of vibration based on the determined state of the braille dot.

20 Claims, 4 Drawing Sheets

(56) References Cited

U.S. PATENT DOCUMENTS

| | | | |
|---|---|---|---|
| 8,388,346 | B2 | 3/2013 | Rantala et al. |
| 8,441,465 | B2 * | 5/2013 | Radivojevic ............ G06F 3/045 178/18.09 |
| 8,494,507 | B1 | 7/2013 | Tedesco et al. |
| 8,963,888 | B2 * | 2/2015 | Radivojevic ............ G06F 3/045 178/18.09 |
| 9,105,198 | B2 * | 8/2015 | Habas .................. G09B 21/008 |
| 9,335,824 | B2 | 5/2016 | Vartanian et al. |
| 9,684,448 | B2 * | 6/2017 | Dagar ................. G06F 3/04886 |
| 9,965,974 | B2 * | 5/2018 | Labbe .................. G09B 21/004 |
| 2009/0327884 | A1 * | 12/2009 | Parks ........................ G06F 3/14 715/700 |
| 2011/0111375 | A1 * | 5/2011 | Luu ...................... G09B 21/004 434/114 |
| 2012/0315606 | A1 | 12/2012 | Jwa |
| 2014/0281950 | A1 | 9/2014 | White et al. |
| 2015/0154885 | A1 | 6/2015 | Livermore-Clifford et al. |
| 2015/0199016 | A1 | 7/2015 | Suzuki et al. |
| 2015/0363365 | A1 | 12/2015 | Campbell |
| 2018/0088770 | A1 | 3/2018 | Brombach et al. |

OTHER PUBLICATIONS

Koh, "Vibrating touch screen enables Braille reading", CNET, Apr. 6, 2009, 6 pages.

Xu et al., "Tactile Display for the Visually Impaired Using TeslaTouch", May 7-12, 2011, 6 pages.

Screen reader on iPhone, http://www.apple.com/accessibility/ios/, accessed May 13, 2016, 9 pages.

Smartphones for Blind, http://www.project-ray.com, accessed May 13, 2016, 5 pages.

The "iPad" for the Blind, http://blitab.com/, accessed May 13, 2016, 14 pages.

Jayant et al., "VBraille: Haptic Braille Perception using a Touch-screen and Vibration on Mobile Phones", Computer Science and Engineering Department, University of Washington, Oct. 25-27, 2010, 2 pages.

Memon et al., "Review of Finger Print Sensing Technologies", 2008 IEEE International Multitopic Conference, Jan. 2009, 7 pages.

"List of IBM Patents or Patent Applications Treated as Related" 1 page, dated Oct. 21, 2019.

Specification "Braille Reading Using Fingerprint Scanner and Varying Vibration Frequencies" and Drawings in U.S. Appl. No. 16/597,397, filed Oct. 9, 2019, 34 pages.

* cited by examiner

BRAILLE READING USING FINGERPRINT SCANNER AND VARYING VIBRATION FREQUENCIES

BACKGROUND

The present invention generally relates to braille reading and, more particularly, to a system and method for braille reading using a fingerprint scanner and varying vibration frequencies.

There is currently no cost effective way to implement braille readers for the visually impaired in consumer devices like smartphones, tablet computers, laptop computers and devices whose traditional output is a video display. Current solutions are not always effective, particularly for a highly specialized or technical vocabulary. Specialized braille reader systems like refreshable braille displays are expensive. Smartphone braille readers are unnatural and slow because they use the whole screen which differs from the more natural way of using fingers to read single characters. Some tablet based systems are effective for writing braille but not for reading braille.

Text-to-speech solutions are common and useful but they cannot cover all situations. For example, text-to-speech solutions often require a user to wear headphones for privacy. Text-to-speech solutions are also not adept at handling some words, especially technical or highly specialized words that may not be pronounced correctly. And, in some situations, text-to-speech solutions are not ideal because some users simply prefer tactile reading.

SUMMARY

In a first aspect of the invention, there is a method that includes: obtaining, by a computer device, data defining a braille cell corresponding to a letter being read; identifying, by the computer device, one of six predefined areas of a fingerprint based on the one of the six predefined areas being centered on a fingerprint sensor; determining, by the computer device, a state of a braille dot of the braille cell that corresponds to the one of the six predefined areas of the fingerprint; and generating, by the computer device, one of a first type of vibration and a second type of vibration based on the determined state of the braille dot.

In another aspect of the invention, there is a system that includes a computer device comprising a fingerprint sensor and a vibration mechanism. The computer device is configured to: identify one of six predefined areas of a fingerprint based on the one of the six predefined areas being centered on the fingerprint sensor; determining a state of a braille dot of a braille cell that corresponds to the one of the six predefined areas of the fingerprint, wherein the state is one of a filled dot and a hollow dot; and cause the vibration mechanism to generate one of: a first type of vibration based on the state being a filled dot; and second type of vibration based on the state being a hollow dot.

In another aspect of the invention, there is a computer program product that includes a computer readable storage medium having program instructions embodied therewith. The program instructions are executable by a computing device to cause the computing device to: convert text data to data defining a braille cell; identify one of six predefined areas of a fingerprint; determine a state of a braille dot of the braille cell that corresponds to the identified one of the six predefined areas of the fingerprint; and generate one of a first type of vibration and a second type of vibration based on the determined state of the braille dot

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to braille reading and, more particularly, to a system and method for braille reading using a fingerprint scanner and varying vibration frequencies. According to aspects of the invention, a braille reader is implemented in a computer device that includes a fingerprint sensor and a vibration mechanism. In embodiments, a person's fingerprint is mapped into six predefined areas that are defined to correspond to the six dot locations of a braille cell. To read a braille cell, the user successively places the six predefined areas of their fingerprint on the fingerprint sensor, and for each of the six predefined areas of their fingerprint the vibration mechanism generates a first type of vibration to represent a filled dot and a second type of vibration to represent a hollow dot of the braille cell being read. The computer device that comprises the fingerprint sensor and vibration mechanism may be a mobile computing device such as a smartphone, tablet computer, or laptop computer, and may include programming to convert written text to braille. In this manner, data that is normally displayed as text on the display screen of the mobile computing device may be converted to braille and then output to the person using the fingerprint sensor and vibration mechanism as described herein.

Implementations of the invention leverage equipment that is included in most smartphones. By using a combination of fingerprint scanning and vibrating, aspects of the invention simulate the marking of a braille character on a finger using software that continuously reads a moving fingerprint on the fingerprint scanner. In embodiments, the software looks for the six predefined areas of the fingerprint and causes the smartphone to vibrate at one of the two vibration frequencies when one of the six predefined areas is at the middle of the fingerprint scanner. After some training and practice, the user will be able to read full braille characters (e.g., a single braille cell) by performing a zig-zag movement of their finger over the fingerprint scanner and determining the braille character based on the unique vibration feedback.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
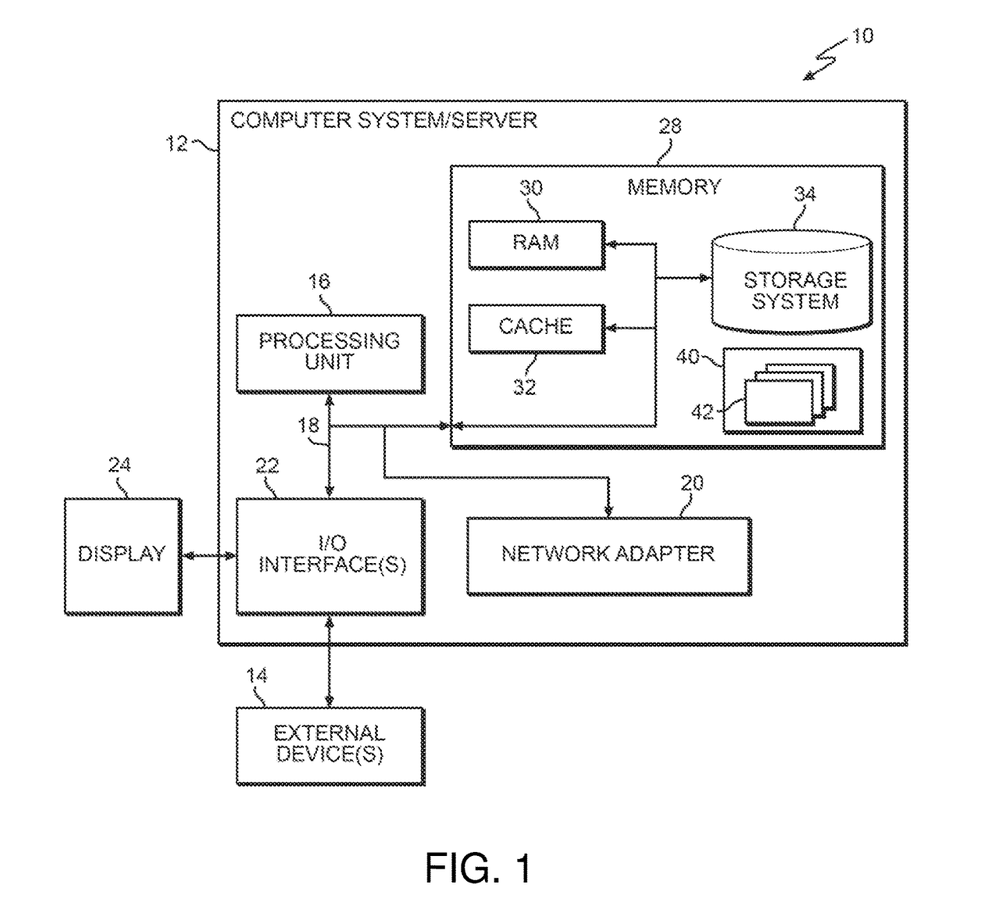
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
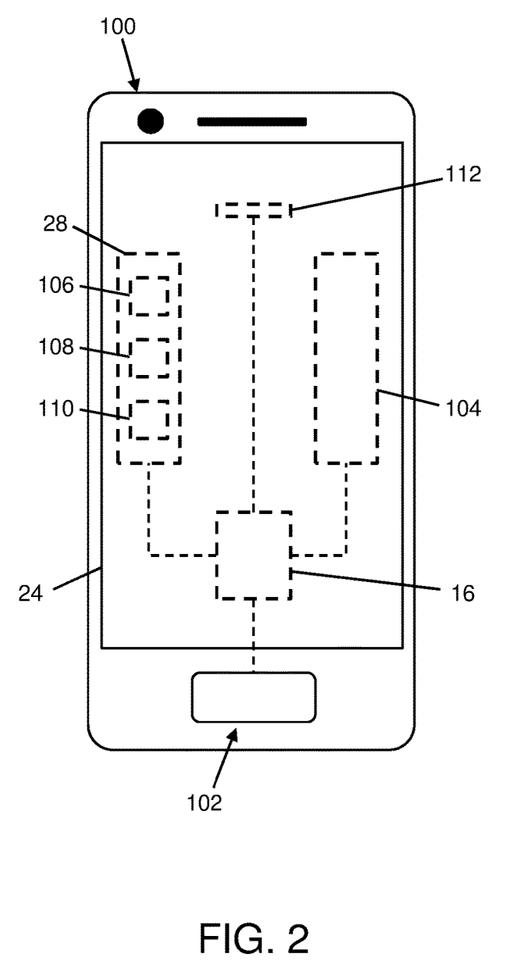
FIG. 2 shows a block diagram of an exemplary system in accordance with aspects of the invention.

FIG. 2 shows a block diagram of an exemplary system in accordance with aspects of the invention. In embodiments, the system includes a device 100 that includes a fingerprint sensor 102 and a vibration mechanism 104. The device 100 may be any suitable mobile computer device such as a smart watch, smartphone, tablet computer, laptop computer, etc. In addition to the fingerprint sensor 102 and the vibration mechanism 104, the device 100 may comprise one or more elements of the computer system 12 as shown in FIG. 1. For example, the device 100 may comprise a CPU 16, a memory 28, and a display 24. The memory 28 may store applications including a text-to-braille module 106, a fingerprint detection module 108, and a braille reader module 110 that are executed by the processing unit 16. The display 24 may comprise a touch screen display that outputs an electronic visual display and that receives user input via stylus and/or finger touch. The device 100 may also include a radio communication antenna 112 and be configured for wireless communication via at least one of cellular, WiFi, Bluetooth, and near field communication (NFC).

The fingerprint sensor 102 may be any suitable type of sensor, including but not limited to a capacitive fingerprint sensor or an optical fingerprint sensor. In embodiments, data obtained by the fingerprint sensor 102 is transmitted to the fingerprint detection module 108, which is configured to determine which one of six predefined fingerprint areas is centered over the fingerprint sensor 102. The fingerprint detection module 108 may determine which of the six predefined fingerprint areas is centered over the fingerprint sensor 102 by comparing the data received from the fingerprint sensor 102 to data stored in the memory 28.

Figure 3:
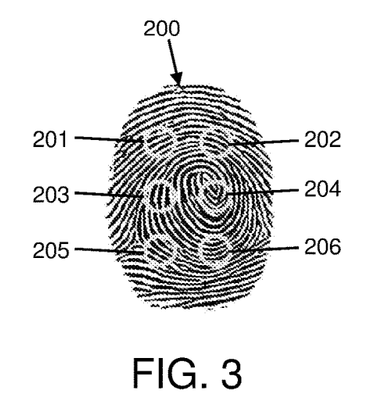
FIG. 3 shows areas of a fingerprint in accordance with aspects of the invention.
Figure 4:
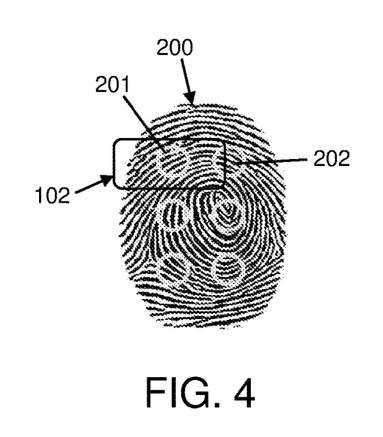
FIG. 4 shows an area of a fingerprint over a fingerprint scanner in accordance with aspects of the invention.

For example, as diagrammatically depicted in FIG. 3, for a fingerprint 200 of a user, the memory 28 may store data defining six areas 201-206 of the fingerprint 200. The six areas 201-206 may be defined using conventional fingerprint identifying features such as patterns of fingerprint ridges including, for example, arches, loops, and whorls. When the user places a portion of their fingerprint 200 on the fingerprint sensor 102, the fingerprint detection module 108 determines which of the six areas 201-206 is centered over the fingerprint sensor 102 by comparing the data received from the fingerprint sensor 102 to the data stored in the memory 28. For example, as shown in FIG. 4, the fingerprint detection module 108 determines that the first area 201 is centered on the fingerprint sensor 102 by comparing the data from the fingerprint sensor 102 to the data stored in the memory 28. The fingerprint module 108 can similarly determine when any one of the other five areas 202-206 is centered on the fingerprint sensor 102. The data defining the six areas 201-206 may be obtained in a training session in which the user is prompted to place the different areas of their fingerprint 200 on the fingerprint sensor 102.

As used herein, centered on the fingerprint sensor 102 refers to the one of the areas 201-206 that is closest to a geometric center location (or some other defined location) of the fingerprint sensor 102. For example, as shown in FIG. 4, plural areas (e.g., areas 201 and 202) may be simultaneously located over the scanning area of the fingerprint sensor 102. In such a situation, the fingerprint detection module 108 may be configured to determine which of the plural areas is closer to the center of the scanning area of the fingerprint sensor 102 (e.g., area 201 in the example shown in FIG. 4).

The fingerprint sensor 102 can be of any desired size and shape. For example, the fingerprint sensor 102 is not limited to the rectangular with rounded corners shape shown in FIGS. 2 and 4, and instead may comprise other shapes such as circular, elliptical, etc.

Still referring to FIG. 2, in accordance with aspects of the invention the text-to-braille module 106 is configured to convert electronic text data to electronic braille cell data. In embodiments, the text-to-braille module 106 may be programmed with text-to-braille logic (e.g., ASCII to braille conversion) to convert any desired electronic text data (e.g., SMS messages, emails, webpages, etc.) to electronic braille cell data.

With continued reference to FIG. 2, the vibration mechanism 104 may be any suitable mechanism that is capable of selectively producing at least two different types of vibration in the device 100. For example, the vibration mechanism 104 may comprise an electric motor with an eccentric mass on a rotating shaft, and the CPU 16 may control a DC current that is applied to the electric motor to rotate the shaft at one of: a first velocity to generate a first frequency of vibration, and a second velocity to generate a second frequency of vibration different than the first. Other types of mechanisms, such as piezoelectric, may be used as the vibration mechanism 104.

Figure 5A:
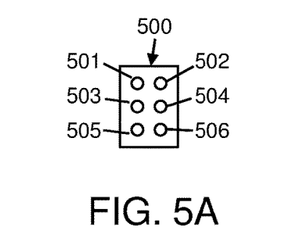
FIGS. 5A-5B depict a braille cell.
Figure 5B:
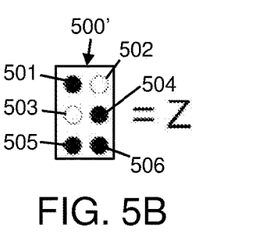

FIG. 5A shows a depiction of a braille cell 500. As is conventionally understood, a braille cell 500 has six dots 501-506 arranged in two vertical columns and three horizontal rows. Each one of the dots 501-506 can be filled or empty to represent a raised dot or an unraised dot. Different combinations of filled and hollow dots 501-506 in the cell 500 can be used to represent different letters, numbers, or punctuation. For example, as shown in FIG. 5B, braille cell 500' includes filled dots 501, 504, 505, 506 and hollow dots 502, 503 to represent the letter "Z". As is understood in the art, each letter "A" through "Z" and each number "0" through "9" as well as various punctuation characters can be mapped to a unique braille cell 500 comprising a unique combination of filled and hollow dots 501-506. In embodiments, data defining such a mapping is stored in the memory 28 of the device 100 for use by the text-to-braille module 106 and the braille reader module 110.

FIGS. 5C-5H depict steps for reading a braille cell using a fingerprint sensor 102 and areas 201-206 of a fingerprint 200 in accordance with aspects of the invention. In the example shown in FIGS. 5C-5H, the braille cell corresponding to the letter "Z" is being read by the user having the fingerprint.

Figure 5C:
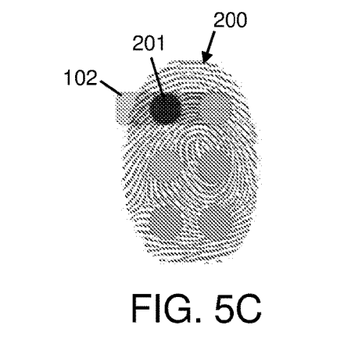
FIGS. 5C-5H depict reading a braille cell using areas of a fingerprint in accordance with aspects of the invention.

At a first step shown at FIG. 5C, the user moves (e.g., positions) their fingerprint 200 relative to the fingerprint sensor 102 such that the first area 201 is centered on the fingerprint sensor 102. According to aspects of the invention, the fingerprint sensor 102 collects fingerprint data from the fingerprint 200 at this position and sends the fingerprint data to the fingerprint detection module 108, which determines from the fingerprint data that the first area 201 is centered on the fingerprint sensor 102. In embodiments, the fingerprint detection module 108 passes data to the braille reader module 110 indicating that the first area 201 of the fingerprint 200 is centered on the fingerprint sensor 102. Based on receiving the indication that the first area 201 is centered on the fingerprint sensor 102, the braille reader module 110 analyzes the corresponding dot (e.g. the first dot 501) of the braille cell being read (received from the text to braille module 106) to determine whether the corresponding dot is a filled dot or a hollow dot (e.g., determine a state of the corresponding dot). In the example of the letter "Z" the first dot 501 is a filled dot. Based on determining that the corresponding dot is a filled dot, the braille reader module 110 causes the vibration mechanism 104 to generate a first type of vibration. The first type of vibration may be, for example, a low frequency vibration. In embodiments, the braille reader module 110 transmits a signal to the CPU 16 which in turn transmits a control signal to the vibration mechanism 104 to generate the first type of vibration.

Figure 5D:
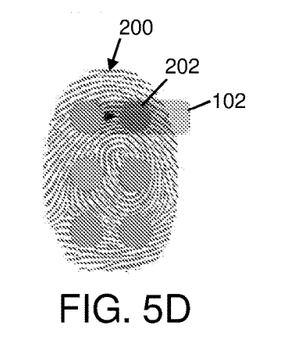

At a second step shown at FIG. 5D, the user moves their fingerprint 200 relative to the fingerprint sensor 102 such that the second area 202 is centered on the fingerprint sensor 102. According to aspects of the invention, the fingerprint sensor 102 collects fingerprint data from the fingerprint 200 at this position and sends the fingerprint data to the fingerprint detection module 108, which determines from the fingerprint data that the second area 202 is centered on the fingerprint sensor 102. In embodiments, the fingerprint detection module 108 passes data to the braille reader module 110 indicating that the second area 202 of the fingerprint 200 is centered on the fingerprint sensor 102. Based on receiving the indication that the second area 202 is centered on the fingerprint sensor 102, the braille reader module 110 analyzes the corresponding dot (e.g. the second dot 502) of the braille cell being read to determine whether the corresponding dot is a filled dot or a hollow dot. In the example of the letter "Z" the second dot 502 is a hollow dot. Based on determining that the corresponding dot is a hollow dot, the braille reader module 110 causes the vibration mechanism 104 to generate a second type of vibration that is different than the first type of vibration. The second type of vibration may be, for example, a high frequency vibration (e.g., a frequency that is sufficiently higher than the low frequency of the first type of vibration such that a user touching the device 100 can perceive the difference between the first type and the second type of vibration).

Figure 5E:
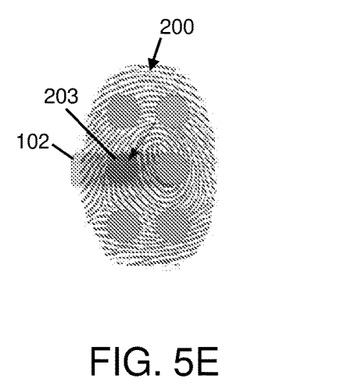

At a third step shown at FIG. 5E, the user moves their fingerprint 200 relative to the fingerprint sensor 102 such that the third area 203 is centered on the fingerprint sensor 102. According to aspects of the invention, the fingerprint sensor 102 collects fingerprint data from the fingerprint 200 at this position and sends the fingerprint data to the fingerprint detection module 108, which determines from the fingerprint data that the third area 203 is centered on the fingerprint sensor 102. In embodiments, the fingerprint detection module 108 passes data to the braille reader module 110 indicating that the third area 203 of the fingerprint 200 is centered on the fingerprint sensor 102. Based on receiving the indication that the third area 203 is centered on the fingerprint sensor 102, the braille reader module 110 analyzes the corresponding dot (e.g. the third dot 503) of the braille cell being read to determine whether the corresponding dot is a filled dot or a hollow dot. In the example of the letter "Z" the third dot 503 is a hollow dot. Based on determining that the corresponding dot is a hollow dot, the braille reader module 110 causes the vibration mechanism 104 to generate the second type of vibration.

Figure 5F:
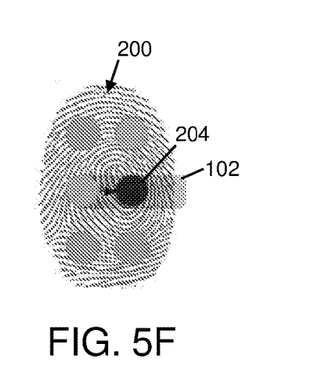

At a fourth step shown at FIG. 5F, the user moves their fingerprint 200 relative to the fingerprint sensor 102 such that the fourth area 204 is centered on the fingerprint sensor 102. According to aspects of the invention, the fingerprint sensor 102 collects fingerprint data from the fingerprint 200 at this position and sends the fingerprint data to the fingerprint detection module 108, which determines from the fingerprint data that the fourth area 204 is centered on the fingerprint sensor 102. In embodiments, the fingerprint detection module 108 passes data to the braille reader module 110 indicating that the fourth area 204 of the fingerprint 200 is centered on the fingerprint sensor 102. Based on receiving the indication that the fourth area 204 is centered on the fingerprint sensor 102, the braille reader module 110 analyzes the corresponding dot (e.g. the fourth dot 504) of the braille cell being read to determine whether the corresponding dot is a filled dot or a hollow dot. In the example of the letter "Z" the fourth dot 504 is a filled dot. Based on determining that the corresponding dot is a filled dot, the braille reader module 110 causes the vibration mechanism 104 to generate the first type of vibration.

Figure 5G:
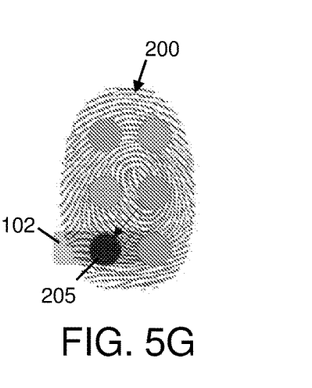

At a fifth step shown at FIG. 5G, the user moves their fingerprint 200 relative to the fingerprint sensor 102 such that the fifth area 205 is centered on the fingerprint sensor 102. According to aspects of the invention, the fingerprint sensor 102 collects fingerprint data from the fingerprint 200 at this position and sends the fingerprint data to the fingerprint detection module 108, which determines from the fingerprint data that the fifth area 205 is centered on the fingerprint sensor 102. In embodiments, the fingerprint detection module 108 passes data to the braille reader module 110 indicating that the fifth area 205 of the fingerprint 200 is centered on the fingerprint sensor 102. Based on receiving the indication that the fifth area 205 is centered on the fingerprint sensor 102, the braille reader module 110 analyzes the corresponding dot (e.g. the fifth dot 505) of the braille cell being read to determine whether the corresponding dot is a filled dot or a hollow dot. In the example of the letter "Z" the fifth dot 505 is a filled dot. Based on determining that the corresponding dot is a filled dot, the braille reader module 110 causes the vibration mechanism 104 to generate the first type of vibration.

Figure 5H:
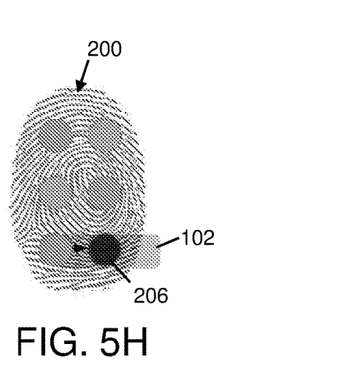

At a sixth step shown at FIG. 5H, the user moves their fingerprint 200 relative to the fingerprint sensor 102 such that the sixth area 206 is centered on the fingerprint sensor 102. According to aspects of the invention, the fingerprint sensor 102 collects fingerprint data from the fingerprint 200 at this position and sends the fingerprint data to the fingerprint detection module 108, which determines from the fingerprint data that the sixth area 206 is centered on the fingerprint sensor 102. In embodiments, the fingerprint detection module 108 passes data to the braille reader module 110 indicating that the sixth area 206 of the fingerprint 200 is centered on the fingerprint sensor 102. Based on receiving the indication that the sixth area 206 is centered on the fingerprint sensor 102, the braille reader module 110 analyzes the corresponding dot (e.g. the sixth dot 506) of the braille cell being read to determine whether the corresponding dot is a filled dot or a hollow dot. In the example of the letter "Z" the sixth dot 506 is a filled dot. Based on determining that the corresponding dot is a filled dot, the braille reader module 110 causes the vibration mechanism 104 to generate the first type of vibration.

In the manner described with respect to FIGS. 5C-5H, a user may read the six dots of a braille cell by successively moving the six areas of their fingerprint in a zig-zag pattern over the fingerprint sensor 102, and detecting whether each dot is a filled dot or a hollow dot based on the type of vibration that is produced for each position of their fingerprint. Aspects of the invention are not limited to a zig-zag pattern, and other patterns may be used and implemented. In embodiments, the braille reader module 110 automatically obtains, from the text to braille module 106, data defining the braille cell of the next letter to be read. In this manner, the process may start anew with the next letter to be read when the user moves their fingerprint 200 such that the first area 201 is centered on the fingerprint sensor 102.

Implementations are not limited to the first and second types of vibrations being different frequency vibrations. For example, the first and second types of vibrations may be the same frequency but different durations. Specifically, the first type of vibration (e.g., described with respect to FIG. 5C) may be a vibration of a particular frequency for a first duration (e.g., time duration), and the second type of vibration (e.g., described with respect to FIG. 5D) may be a vibration of the particular frequency for a second duration (e.g., time duration).

In embodiments, the system is configured to provide a unique output to indicate the end of a word being read. For example, the text to braille module 106 may send an end-word signal to the braille reader module 110 immediately after the last letter of a word has been read. Upon receiving the end-word signal, the braille reader module 110 may cause the vibration mechanism 104 to generate a third type of vibration that is different from the first type and the second type. As but one example, each of the first type and the second type of vibration may comprise a single actuation of the vibration mechanism 104 for a relatively long duration, and the third type of vibration may comprise plural short duration actuations of the vibration mechanism 104. In this manner, the user may determine that the end of a word has been reached based on detecting the third type of vibration. In embodiments when the first type and the second type of vibration have differing durations (i.e., a respective first duration and second duration), then the third type of vibration may have a third duration that is different than the first duration and the second duration.

Figure 6:
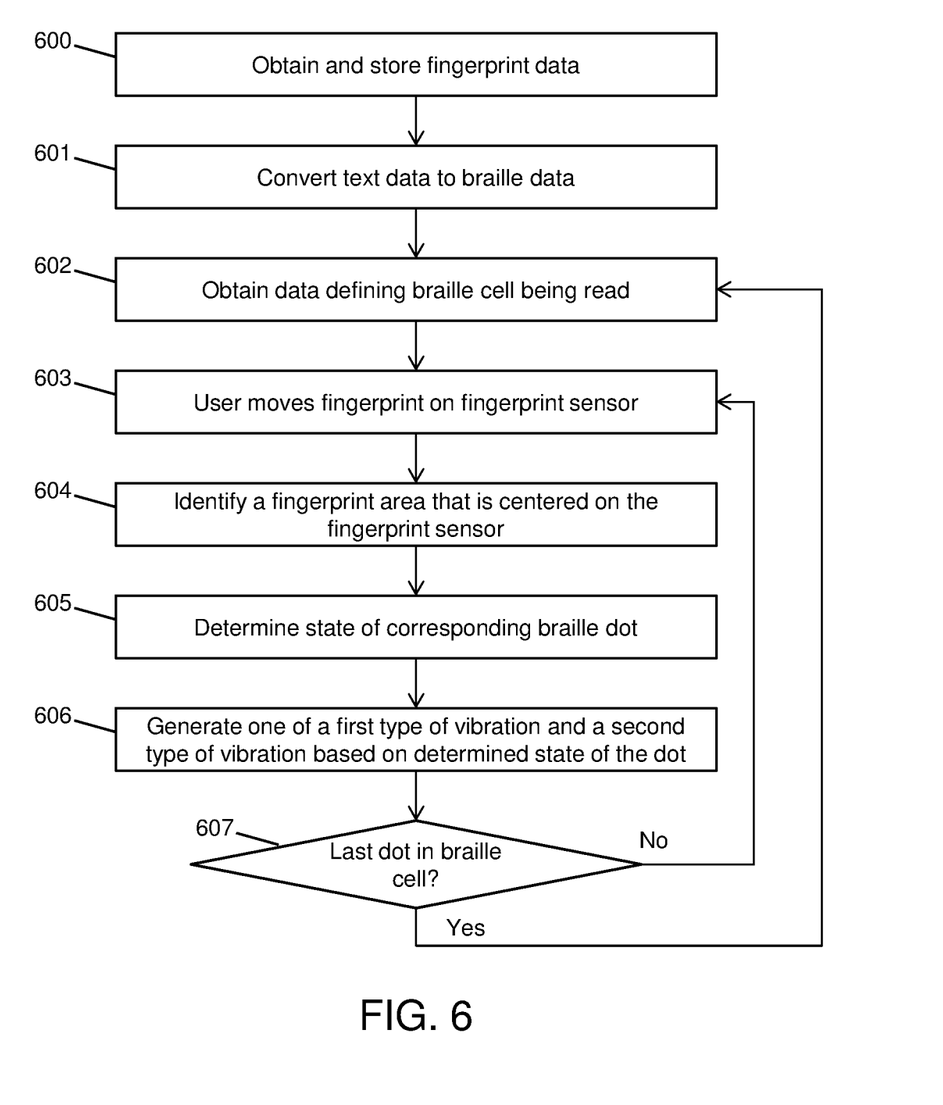
FIG. 6 shows a flowchart of a method in accordance with aspects of the invention.

FIG. 6 depicts a method of reading braille in accordance with aspects of the invention. The steps of the method may be performed in the system of FIG. 2 and are described with reference to the elements and steps described in FIGS. 2-5H.

Referring to FIG. 6, at step 600 the device 100 obtains and stores data defining plural different areas of a user's fingerprint 200. In embodiments, as described with respect to FIGS. 2-5H, the fingerprint sensor 102 is used to collect fingerprint data from a fingerprint 200 of a user, the device 100 stores data (e.g., in memory 28) that defines six areas 201-206 of the fingerprint 200.

At step 601, the device 100 converts electronic text data to electronic braille data. In embodiments, as described with respect to FIGS. 2-5H, the text-to-braille module 106 converts electronic text data (e.g., text of an SMS message, text of an email, text of a website, etc.) to electronic braille data using a mapping of ASCII text characters to braille cells.

At step 602, the device 100 obtains a next braille letter to be read. In embodiments, as described with respect to FIGS. 2-5H, the braille reader module 110 obtains the data defining a braille cell of the next letter to be read. The data may be obtained from the text-to-braille module 106 in either a push or a pull manner. In this manner, the system obtains data defining a braille cell corresponding to a letter being read.

At step 603, a user moves their finger or thumb to a position on the fingerprint sensor 102. Specifically, the user moves their finger or thumb relative to the fingerprint sensor 102 such that one of six predefined areas 201-206 of their fingerprint 200 is centered on the fingerprint sensor 102.

At step 604, the device 100 identifies one of the six predefined areas 201-206 that is centered on the fingerprint sensor 102. In embodiments, as described with respect to FIGS. 2-5H, the fingerprint sensor 102 collects fingerprint data from the fingerprint 200 at this position and sends the fingerprint data to the fingerprint detection module 108. The fingerprint detection module 108 compares the collected fingerprint data to stored data that defines the six predefined areas 201-206 of their fingerprint 200. Based on this comparison, the fingerprint detection module 108 determines which one of six predefined areas 201-206 is centered on the fingerprint sensor 102.

At step 605, the device 100 determines a state of a dot in the braille cell that corresponds to the one of six predefined areas 201-206 that was determined at step 604. In embodiments, as described with respect to FIGS. 2-5H, the fingerprint detection module 108 passes data to the braille reader module 110 indicating the determined one of the six predefined areas 201-206 that is centered on the fingerprint sensor 102. Based on receiving the indication of the determined one of the six predefined areas 201-206, the braille reader module 110 analyzes the corresponding dot of the braille cell being read to determine the filled/empty state of the corresponding dot. For example, when the determined one of the six predefined areas 201-206 is the first area 201, then at step 605 the braille reader module 110 determines whether the first dot of the braille cell is a filled dot or a hollow dot.

At step 606, the device 100 generates one of a first type of vibration and a second type of vibration based on the state of the dot determined from step 605. In embodiments, as described with respect to FIGS. 2-5H, the braille reader module 110 causes the vibration mechanism 104 to generate the first type of vibration when the determined state of the dot is a filled dot, and causes the vibration mechanism 104 to generate the second type of vibration when the determined state of the dot is a hollow dot.

At step 607, the device 100 determines whether the dot from step 605 is the last dot in the braille cell from step 602. In embodiments, as described with respect to FIGS. 2-5H, when the dot from step 605 is not the last dot in the braille cell, then the process returns to step 603 where the user moves their fingerprint to the next position on the fingerprint sensor 102. When the dot from step 605 is the last dot in the braille cell, then the process returns to step 602 where the device obtains data defining the next braille cell to be read.

As described herein, aspects of the invention may be used to provide a computer-implemented method for reading a braille character, the braille character having a pattern of dots arranged in locations of a matrix having three rows of two locations. The computer-implemented method may include: sensing a fingerprint with a fingerprint scanner in a calibration operation, wherein the calibration operation senses the entirety of the fingerprint; storing first, second, third, fourth, fifth, and six patterns in a memory, wherein the first, second, third, fourth, fifth, and six patterns correspond with first, second, third, fourth, fifth, and six regions of the fingerprint, and additionally correspond with first, second, third, fourth, fifth, and six locations of the braille character matrix; detecting one of the first, second, third, fourth, fifth, or six patterns in a central area of the fingerprint scanner; determining a location in the braille character matrix corresponding with the detected one pattern; and in response to detecting the one pattern, outputting a first vibration when a dot of the braille alphabet character occupies the location corresponding with the one pattern, and outputting a second vibration when a dot of the braille alphabet character does not occupy the location corresponding with the one pattern.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

obtaining, by a computer device, data defining a braille cell corresponding to a letter being read;

identifying, by the computer device, one of six predefined areas of a fingerprint based on the one of the six predefined areas being centered on a capacitive fingerprint sensor, the identifying including identifying patterns of fingerprint ridges of the fingerprint including arches, loops, and whorls;

determining, by the computer device, a state of a braille dot of the braille cell that corresponds to the one of the six predefined areas of the fingerprint; and generating, by the computer device, one of a first type of vibration and a second type of vibration based on the determined state of the braille dot.

2. The method of claim 1, wherein the determining the state of the braille dot comprises determining that the braille dot is one of a filled dot and a hollow dot.

3. The method of claim 2, wherein:
the first type of vibration is a low frequency vibration; and
the second type of vibration is a high frequency vibration.

4. The method of claim 1, wherein the computer device is a mobile computer device comprising the fingerprint sensor and a vibration mechanism that is selectively actuated to generate the one of the first type of vibration and the second type of vibration.

5. The method of claim 1, further comprising:
obtaining, using the fingerprint sensor, data that defines the six predefined areas of the fingerprint; and
storing the data that defines the six predefined areas of the fingerprint in a memory of the computer device.

6. The method of claim 1, further comprising repeating the identifying, the determining, and the generating for all dots included in the braille cell.

7. The method of claim 1, wherein the braille cell is a first braille cell in a word, and further comprising performing the steps of claim 1 for a second braille cell in the word, and generating a third type of vibration after a last braille cell in the word has been read.

8. The method of claim 1, further comprising converting text data to the data defining the braille cell.

9. A system, comprising:
a computer device comprising a capacitive fingerprint sensor and a vibration mechanism, wherein the computer device is configured to:
identify one of six predefined areas of a fingerprint based on the one of the six predefined areas being centered on the fingerprint sensor, the identifying being based on identify patterns of fingerprint ridges of the fingerprint including arches, loops, and whorls;
determine a state of a braille dot of a braille cell that corresponds to the one of the six predefined areas of the fingerprint, wherein the state is one of a filled dot and a hollow dot; and
cause the vibration mechanism to generate one of: a first type of vibration based on the state being the filled dot; and second type of vibration based on the state being the hollow dot.

10. The system of claim 9, wherein:
the first type of vibration has a first duration; and
the second type of vibration has a second duration that is different than the first duration.

11. The system of claim 9, wherein the computer device is one of a smartphone, and a tablet computer.

12. The system of claim 9, wherein the computer device is configured to:
obtain, using the fingerprint sensor, data that defines the six predefined areas of the fingerprint; and
store the data that defines the six predefined areas of the fingerprint in a memory of the computer device.

13. The system of claim 9, wherein the six predefined areas of the fingerprint correspond to six braille cell dot locations.

14. The system of claim 9, wherein the computer device is configured to convert electronic text data to the data defining the braille cell.

15. A computer program product comprising a computer readable storage medium having program instructions embodied therewith, the program instructions executable by a computer device to cause the computing device to:
convert text data to data defining a braille cell;
identify one of six predefined areas of a fingerprint based on one of the six predefined areas being centered on a capacitive fingerprint sensor, the identifying being based on identifying patterns of fingerprint ridges of the fingerprint including arches, loops, and whorls;
determine a state of a braille dot of the braille cell that corresponds to the identified one of the six predefined areas of the fingerprint; and
generate one of a first type of vibration and a second type of vibration based on the determined state of the braille dot.

16. The computer program product of claim 15, wherein the determining the state of the braille dot comprises determining that the braille dot is one of a filled dot and a hollow dot.

17. The computer program product of claim 15, wherein:
the first type of vibration is a low frequency vibration; and
the second type of vibration is a high frequency vibration.

18. The computer program product of claim 15, wherein the computer device is a mobile computer device comprising the fingerprint sensor and a vibration mechanism that is selectively actuated to generate the one of the first type of vibration and the second type of vibration.

19. The computer program product of claim 15, wherein the program instructions cause the computer device to:
obtain, using the fingerprint sensor, data that defines the six predefined areas of the fingerprint; and
store the data that defines the six predefined areas of the fingerprint in a memory of the computer device.

20. The computer program product of claim 15, wherein the identifying the one of the six predefined areas is based on the one of the six predefined areas being centered on the fingerprint sensor.

* * * * *